United States Patent [19]
Shibata et al.

[11] Patent Number: 6,073,529
[45] Date of Patent: Jun. 13, 2000

[54] MITER CIRCULAR SAW WITH AN IMPROVED WORKPIECE SUPPORT FENCE

[75] Inventors: Yoshinori Shibata, Anjo; Hisashi Higuchi, Chita; Toshiyuki Kani, Anjo, all of Japan

[73] Assignee: Makita Corporation, Anjo, Japan

[21] Appl. No.: 09/245,536

[22] Filed: Feb. 5, 1999

[30] Foreign Application Priority Data

Feb. 6, 1998 [JP] Japan ................................. 10-026184
Jun. 22, 1998 [JP] Japan ................................. 10-175115

[51] Int. Cl.$^7$ ................................................. B27B 27/00
[52] U.S. Cl. .......................... 83/468.5; 83/581; 83/468.6; 83/471.3
[58] Field of Search ................................ 83/468.6, 468.5, 83/490, 581, 468.3, 471.3, 574, 486.1, 745; 269/303, 315, 319

[56] References Cited

U.S. PATENT DOCUMENTS

| | | | |
|---|---|---|---|
| 5,181,488 | 1/1993 | Terpstra ................................. | 83/490 X |
| 5,297,463 | 3/1994 | O'Banion et al. ..................... | 83/490 X |
| 5,752,422 | 5/1998 | Inoue et al. ............................ | 83/468.3 |
| 5,816,129 | 10/1998 | Singer ................................... | 83/468.3 |
| 5,829,333 | 11/1998 | Itzov ..................................... | 83/490 X |
| 5,957,022 | 9/1999 | Stumpf et al. ........................ | 83/468.6 X |

FOREIGN PATENT DOCUMENTS

| | | | |
|---|---|---|---|
| 2291006A | 1/1996 | United Kingdom ............ | B27B 27/08 |

*Primary Examiner*—M. Rachuba
*Assistant Examiner*—Dominic Troiano
*Attorney, Agent, or Firm*—Lahive & Cockfield, LLP

[57] ABSTRACT

A miter circular saw includes a base on which a workpiece is placed, a tiltable saw blade assembly mounted on the base, and a work support fence that includes a fixed element with a first support surface and a movable element with a second support surface, both of which are mounted on the base for supporting the workpiece during cutting. The movable element is hinged to the top end of the fixed element to allow the movable element to pivot between a raised position, above the fixed element, and a lowered position. In the raised position, the movable element engages the fixed element so as to fix the movable element and prevent it from inadvertently falling rearward into the lowered position. In the raised position, the movable element places the second support surface flush with the first support surface of the fixed element. When the movable element is in the lowered position, the work support fence is sufficiently low to avoid interference with the locus of the saw blade assembly in its maximally tilted position.

19 Claims, 15 Drawing Sheets

FIG. 3
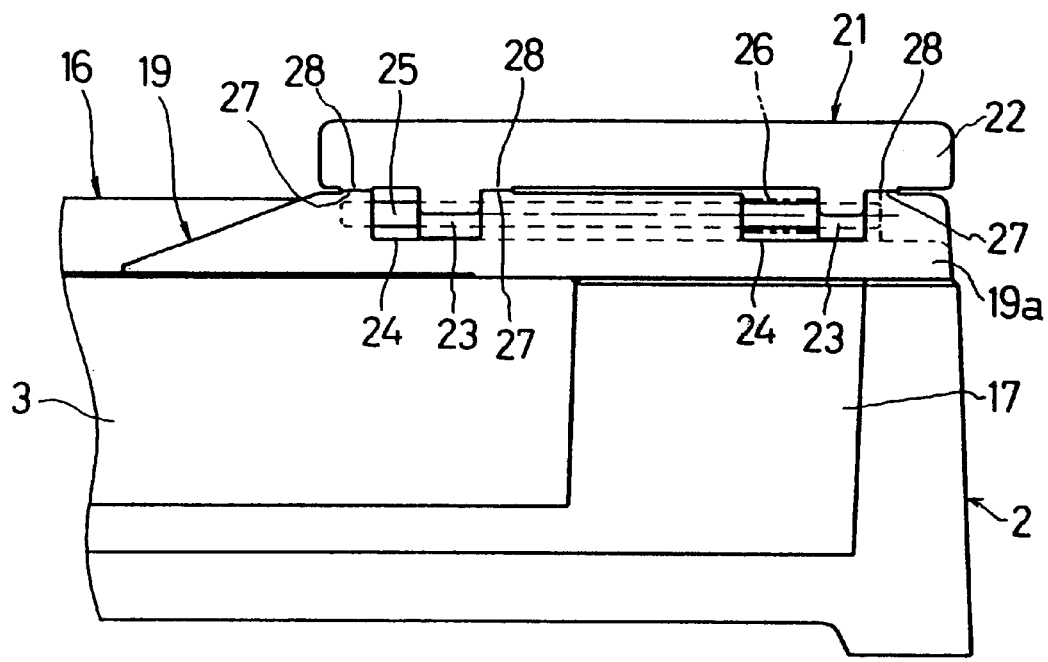
FIG. 4A   FIG. 4B
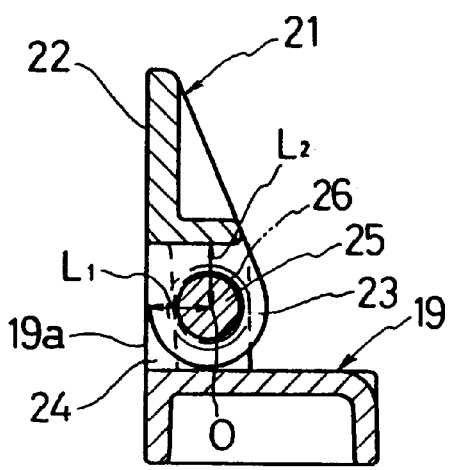 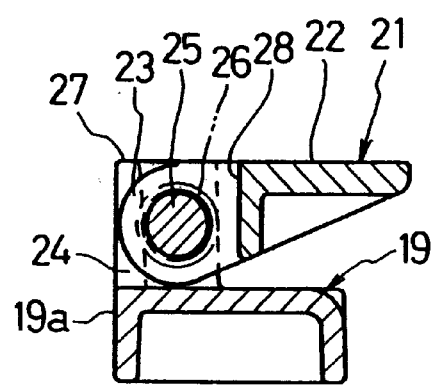

MITER CIRCULAR SAW WITH AN IMPROVED WORKPIECE SUPPORT FENCE

This application claims priority to Japanese Patent Application No. 10-26184 and Japanese Patent Application No. 10-175115, the contents of which are incorporated herein by reference.

BACKGROUND OF THE INVENTION

The present invention relates to miter circular saws. More particularly, the present invention relates to a miter circular saw including a base on which a workpiece is placed and a fence structure against which the workpiece is pressed for supporting and positioning thereof.

DESCRIPTION OF THE RELATED ART

A typical miter circular saw comprises a saw support arm mounted on a base or on a turntable on a base, and a saw blade assembly. The assembly includes a saw blade and is supported by the arm so as to be upwardly pivotable on one end of the arm. Such a saw also includes, on the base, a work support fence for supporting and positioning the workpiece. With the saw blade held perpendicular to the top surface of the base, this type of saw can make vertical cuts in a workpiece. With the saw blade instead tilted sideways to change the angle between the side faces of the saw blade and the top surface of the base, this type of saw can make bevelled cuts in the workpiece.

In order to make a bevelled cut, however, a portion of the work support fence i s typically removed in order to provide sufficient clearance for the tilted saw blade assembly to translate along a saw path without interference from the fence. Known configurations for a work support fence switchable between a bevel cut position and a vertical cut position, however, decrease the surface of the fence for support of workpieces during both vertical and bevel cutting, thereby generally affecting the accuracy of cutting.

Applicant proposed, in Japan Published Unexamined Patent Application No. 9-103913 (corresponding to U.S. Pat. No. 5,752,422 issued on May 19, 1998), a circular saw with an improved fence structure having a main support fence and an auxilliary support fence. The main support fence has a removed corner portion. The auxilliary support fence is pivotable between a bevel cutting position and a vertical cutting position. In the bevel cutting position, the removed corner portion of the main support fence is exposed and provides clearance for the saw blade assembly making a beveled cut in the workpiece. In the vertical cutting position, the auxilliary fence pivots into position to fill in the removed corner portion of the main fence, thereby providing additional support for the workpiece in th e vertical cutting position.

In the foregoing fence structure, since the auxiliary support fence is intended to provide support in a limited area, it is difficult to compensate for the large missing upper surface for supporting a workpiece. Sufficient support for a workpiece by this type of pivotal auxiliary support fence requires that the fence be an elongated auxiliary fence. Such a fence requires a large pivot space. In particular, when the auxiliary support fence is pivoted to the second position, away from the saw blade assembly, it extends a substantial distance from the circular saw.

Another example of an improved guide structure for use in a miter circular saw is pro posed in Japan Published Unexamined Patent Application No. 8-39508 (corresponding to U.S. patent application Ser. No. 272,327 filed on Jul. 8, 1994). That circular saw includes an invertible support element (fence) with a comer portion removed. When the saw blade assembly is tilted for bevel cutting, the support element is installed so that the removed comer portion is located adjacent to the saw blade assembly. The removed comer portion thus provides clearance so that the fence does not interfere with the tilted saw blade assembly as the saw blade assembly slides a long a sawing path. When the saw blade assembly is not tilted, and therefore configured to perform vertical cutting, the support element is installed in an inverted position in which the removed comer portion is on the base and not adjacent to the saw blade. In this position, the fence provides sufficient support for the workpiece during vertical cutting.

In this second example of a fence structure, the work support surface has the same height and area for both vertical and bevel cutting. Therefore, the range of angles at which the saw blade assembly can be tilted and still be free of interference from the fence is limited. Moreover, it is inconvenient to have to remove, invert, and then reinstall the fence each time the saw blade assembly is reconfigured.

SUMMARY OF THE INVENTION

In view of the above-identified problems, an important object of the present invention is to provide a miter circular saw having a saw blade assembly that can be tilted in two opposite directions orthogonal to the side faces of the saw blade while providing sufficient support for the workpiece during bevel cutting, regardless of the direction of the tilt.

Another object of the present invention is to provide a miter circular saw having a fence that is easily movable to avoid interference with the saw blade assembly when it is tilted for bevel cutting, while providing broad and sufficient support for the workpiece during vertical cutting.

The above objects and other related objects are realized by the invention, which provides a miter circular saw including: a base on which a workpiece is placed; a saw blade assembly including a motor-driven saw blade and mounted on the base, the saw blade assembly being tiltable to a desired angle orthogonal to the side faces of the saw blade; and a work support fence mounted on the base for supporting the workpiece. The work support fence includes a fixed element having a first support surface on which the workpiece is supported and further having a height selected to avoid interference with the locus of the saw blade assembly when the assembly is tilted. The miter circular saw further includes a movable element having a second support surface and being hinged to the fixed element to allow movement of the movable element between a first raised position above the fixed element, in which the second support surface is located coplanar with the first support surface, and a first lowered position away from the workpiece.

According to one aspect of the present invention, the miter circular saw further includes means for fixing the movable element in the first raised position.

According to another aspect of the present invention, in which the fixed element has an upper end and the movable element has a lower end, the means for fixing includes at least one lower contact surface formed on the upper end of the fixed element and at least one upper contact surface formed on the lower end of the movable element. The at least one upper contact surface is adapted to be brought into contact with the at least one lower contact surface when the movable element is moved to the first raised position.

According to still another aspect of the present invention, the movable element, while moving from the first lowered position to the first raised position, passes through a second raised position, with the locus of the movable element from the second raised position to the first raised position being parallel to the first support surface.

Additionally, the means for fixing further includes means, such as a compression spring, for urging the movable element to slide from the second raised position to the first raised position, thereby bringing the at least one upper contact surface into contact with the at least one lower contact surface.

According to yet another aspect of the present invention, the at least one upper contact surface comprises an upper horizontal surface and the at least one lower contact surface comprises a lower horizontal surface having approximately the same area as the upper horizontal surface.

In one aspect, the at least one lower contact surface comprises a first inclined surface and the at least one upper contact surface comprises a second inclined surface having approximately the same inclination as the first inclined surface.

In another aspect, the at least one lower contact surface comprises an inclined surface and the at least one upper contact surface comprises a stepped portion for coming into contact with, and being urged upward by, the lower inclined surface when the movable element is slid to the first raised position.

In still another aspect, the miter circular saw further includes screw means provided in the movable element for being tightened into the fixed element when the movable element is in the first raised position.

The invention is also directed to an embodiment which provides a miter circular saw including: a base having a top surface on which a workpiece is placed; a saw blade assembly including a motor-driven saw blade and mounted on the base, the saw blade assembly being tiltable to a desired angle orthogonal to the side faces of the saw blade; and a work support fence which is mounted on the base and against which the workpiece is pressed for support. The work support fence is constructed to have a height selected to avoid interference with the locus of the saw blade assembly when the assembly is tilted. The circular saw further includes a movable element provided in the work support fence. The movable element has a first support plate having a bottom end and further having the same height as the work support fence. Additionally, the movable element has a second support plate which is higher than the first support plate and which has a bottom end orthogonally connected to the bottom end of the first support plate so that each of the two support plates are selectably pivoted about the connection of the two bottom ends between a raised position and a lowered position. The circular saw further includes a recess formed in the base for accommodating the second support plates so that the second support plates lie flat in the recess, thereby protruding no higher than the top surface of the base when the first support plate is in the raised position.

According to one aspect, the work support fence includes a first support surface against which the workpiece is pressed for support, the first support plate of the movable element includes a second support surface located coplanar with the first support surface when the first support plate is in the raised position, and the second support plate of the movable element includes a third support surface located coplanar with the first support surface when the second support plate is in the raised position.

According to another aspect, the second support plate is the support plate that can be accommodated in the recess, and the second support plate is shaped so as to fit in the recess flush with the top surface of the base.

According to still another aspect, the second support plate has a height at least twice that of the first support plate and a through-hole formed in a center portion thereof. In this aspect recess is shaped in a loop surrounding a portion of the top surface of the base that corresponds to the shape of the through-hole.

The invention is also directed to an embodiment which provides a miter circular saw including: a base on which a workpiece is placed; a saw blade assembly including a motor-driven saw blade and mounted on the base, the saw blade assembly being tiltable to a desired angle orthogonal to the side faces of the saw blade; and a work support fence mounted on the base for supporting the workpiece. In this embodiment, the work support fence includes a fixed element having a first support surface on which the workpiece is supported and a rear surface, the fixed element having such a height as to avoid interference with the locus of the saw blade assembly when the assembly is tilted. Also included in the work support fence are a movable element having a second support surface, and connecting means provided upright on the rear surface of the fixed element, the connecting means being foldable in a direction away from the first support surface at a point located lower than the fixed element and having a top end which is secured to the movable element. The movable element is adapted so as to be movable between a raised position above the fixed element where the second support surface is located coplanar with the first support surface and a lowered position away from the first support surface as the connecting means is folded. The work support fence further includes lock means for preventing the connecting means from folding away from the first support surface when the movable element is in the raised position.

In one aspect, the connecting means comprises at least one rod which includes an upper section pivotal away from the first support surface of the fixed element, a lower section separated from the upper section, and a pin for pivotally connecting the upper section with the lower section. The miter circular saw further includes on the rear surface of the fixed element at least one cylindrical portion into which the at least one rod is inserted so as to be vertically slidable between an upper position corresponding to the lowered position of the movable element and a lower position where the upper and lower sections are held straight that corresponds to the raised position of the movable element. Furthermore, the lock means is at least one screw penetrating the at least one cylindrical portion to the at least one rod for pressing the rod when tightened.

In another aspect, the at least one rod further includes means for preventing the rod from slipping out of the at least one cylindrical portion.

The invention is also directed to an embodiment which provides a miter circular saw including: a base on which a workpiece is placed; a saw blade assembly including a motor-driven saw blade and mounted on the base, the saw blade assembly being tiltable to a desired angle orthogonal to the side faces of the saw blade; and a work support fence mounted on the base, the work support fence having a front surface for supporting the workpiece and a rear surface and further having such a height as to avoid interference with the focus of the saw blade assembly when the assembly is tilted. Furthermore, an upper portion of the work support fence is sectioned into a movable element which has a front surface and a rear surface and is separable from the rest of the work support fence. The miter circular saw further include at least one rod vertically slidably erected on the rear surface of the work support fence and having a top end which is connected to the rear surface of the movable element. The saw is further provided with lock means for fixing the at least one rod in a desired vertical position.

In one practice, the front surface of the movable element remains coplanar with the front surface of the work support fence, regardless of the vertical position of the movable element.

In another practice, the work support fence further includes on the rear side thereof at least one cylindrical portion into which the at least one rod is vertically slidably inserted, and the lock means is at least one screw penetrating the at least one cylindrical portion to the at least one rod for pressing the rod when tightened.

To carry out the invention in one preferred mode, the at least one rod further includes means for preventing the rod from slipping out of the at least one cylindrical portion.

BRIEF DESCRIPTION OF THE DRAWINGS

For a fuller understanding of the nature a nd objects of the present invention, reference should be made to the following detailed description and the accompanying drawings, in which:

FIG. 3 shows, in enlargement, a raised movable element of the work support fence of the miter circular saw shown in FIG. 1;

FIG. 4A is an enlarged vertical cross section of the movable element shown in FIG. 3 taken along a cylindrical protrusion, with the movable element in a raised position;

FIG. 4B is another enlarged vertical cross section of the movable element shown in FIG. 3, with the movable element in a lowered position;

DETAILED DESCRIPTION OF THE PREFERRED EMBODIMENT

Preferred embodiments according to the present invention will be described hereinafter with reference to the attached drawings.

Embodiment 1

Figure 1:
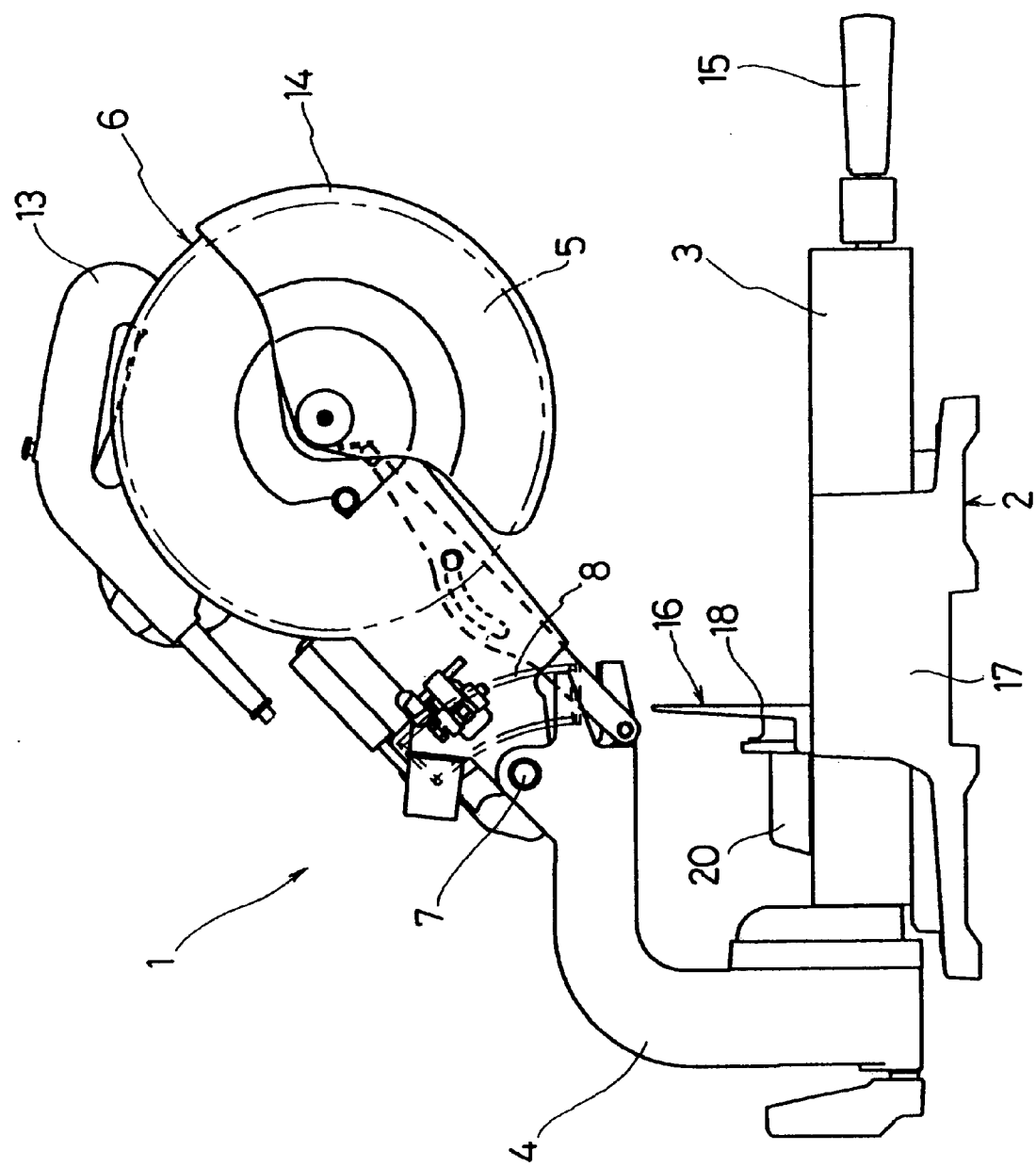
FIG. 1 is a side elevation of a miter circular saw according to the present invention.
Figure 2:
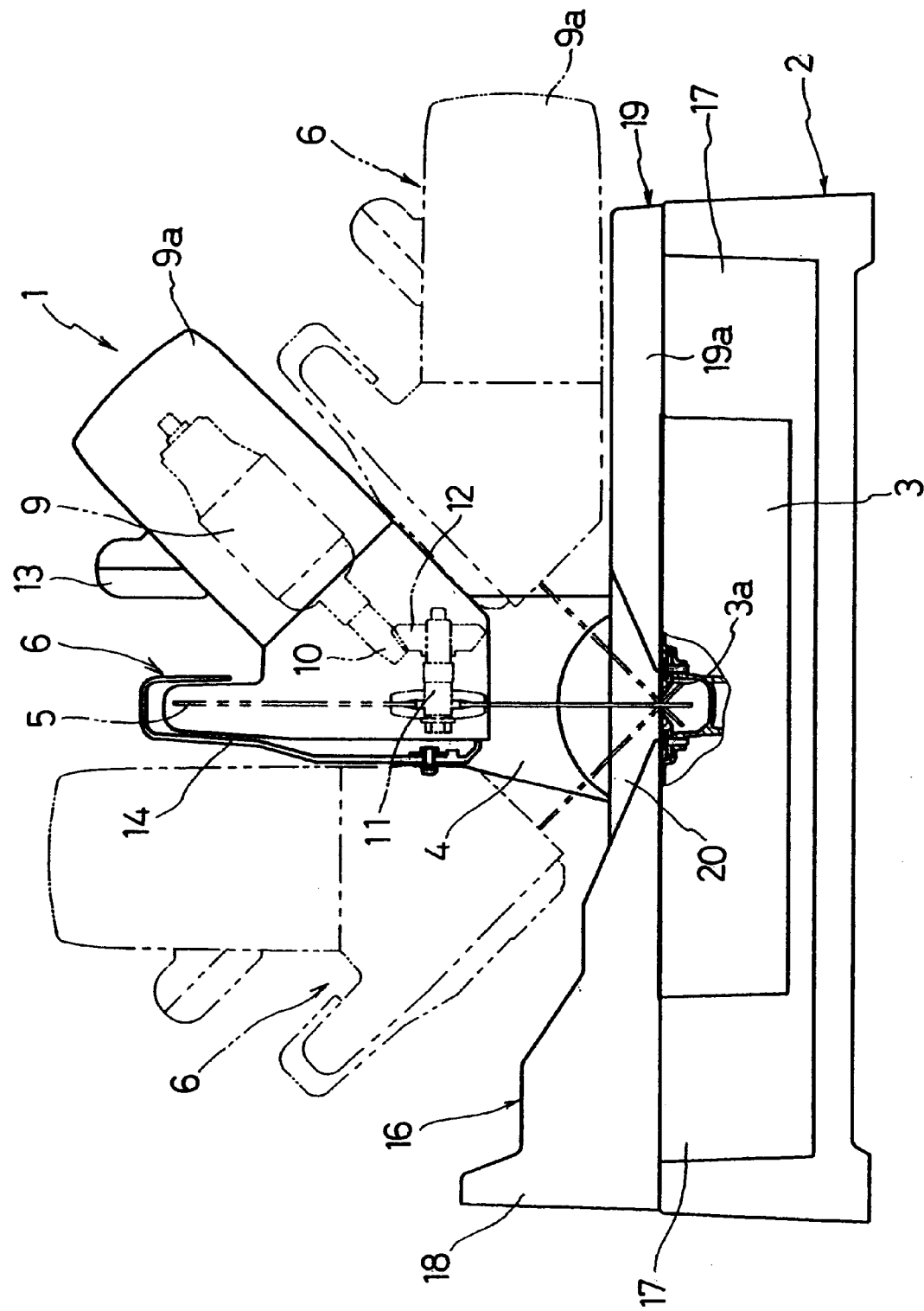
FIG. 2 is a front elevation of the miter circular saw shown in FIG. 1.
Figure 5:
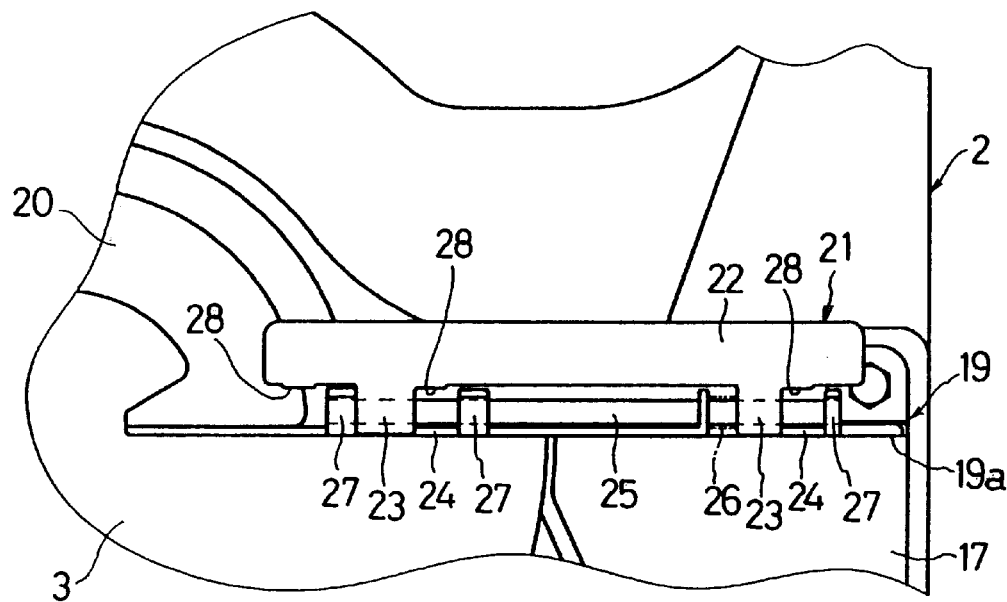
FIG. 5 is a partial plan view of the miter circular saw shown in FIG. 1, showing the movable element in a lowered position.

FIG. 1 is a side elevation of a miter circular saw 1 according to the present invention. The miter circular saw 1 includes a base 2 and a horizontally rotatable turntable 3 mounted on the base 2. A saw support arm 4 is connected to the rear end (to the left of FIG. 1) of the turntable 3. A saw blade assembly 6 including a motor-rotated saw blade 5 is supported at the top end of the saw support arm 4 with a shaft 7 so as to be vertically pivotal on the shaft 7. In addition, the saw blade assembly 6 is urged to the illustrated upper position by a compression spring 8. Referring to FIG. 2, the saw blade assembly 6 includes a motor housing 9a that contains a motor 9 having a main shaft 10.

The main shaft is coupled by means of a bevel gear 12 to a rotary shaft 11 on which the saw blade 5 is mounted. As illustrated, the motor 9 is disposed at 45 degrees with respect to the side surfaces of the saw blade 5 due to the bevel coupling between the motor shaft 10 and the rotary shaft 11. In addition, the saw blade assembly 6 includes a saw handle 13 and a lower blade guard 14. A turntable positioning handle 15 projects horizontally from the front end of the turntable 3 to selectively rotate the turntable 3 relative to the base 2.

The lower end of the saw support arm 4 is connected to a slide shaft (not shown) that penetrates the turntable 3 from the front portion to the end portion thereof so that an operator can slide the saw blade assembly 6 and the saw support arm 4 parallel to the side surface of the saw blade 5 to cut a workpiece by operating the saw handle 13. Referring to FIG. 2, the saw support arm 4 can be tilted up to 45 degrees from the vertical position in both lateral directions and locked at any desired angle within the range of tilt, as indicated by two-dot chain lines. The miter circular saw 1, therefore, can make vertical cuts in workpieces when the saw blade 5 is brought down with its side faces at right angles to the upper surface of the turntable 3. The miter circular saw 1 can also make bevel cuts in workpieces with the saw support arm 4 and the saw blade assembly 6 tilted in either lateral direction (as shown in FIG. 2). In addition, it can perform angular (or miter) cutting by rotating the support arm 4 and the saw blade assembly 6 relative to the base 2 with the turntable positioning handle 15 in order to position the saw blade 5 in a desired miter setting.

Still referring to FIGS. 1 and 2, provided on the turntable is a work support fence 16 against which a workpiece is held in order to position and support the workpiece during operation. The work support fence 16 includes a right work engaging element 19, a left work engaging element 18, and a curved section 20 that circumvents a blade slit 3a formed in the middle of the turntable 3 and connects the right and left work engaging elements 18 and 19. The left and right work engaging elements 18, 19 are both bolted to right and left side portions 17, the top surfaces of which are flush or coplanar with that of the turntable 9. The left work engaging element 18 has a left support surface forming a right angle with the upper surfaces of the turntable 3 and the side portion 17. Likewise, the right work engaging element 19 includes a first support surface 19a erected at a right angle to the upper surfaces of the turntable 3 and the side portion 17. The height of the first support surface 19a is such that the motor housing 9a does not interfere with the right work engaging element 19 when the saw blade assembly 6 is maximally tilted towards the element 19. Referring to FIG. 3, a movable element 21 is hinged to the upper end of the right work engaging element 19. More particularly, the movable element 21 includes a generally rectangular second support surface 22 and a pair of cylindrical protrusions 23 formed at the lower end (as seen in FIG. 3 and FIG. 4A) of the second support surface 22. The cylindrical protrusions 23 are accommodated in a pair of recesses 24 formed in the upper end of the right work engaging element 19. In addition, a hinge pin 25 mounted in the right work engaging element 19 behind the first support surface 19a penetrates the cylindrical protrusions 23 in the recesses 24 to hinge the movable element 21 to the right work engaging element 19 such that when the movable element 21 is raised upright, the second support surface 22 is flush with the first support surface 19a.

As illustrated, the recesses 24 are wider than the cylindrical protrusions 23, thus allowing the movable element 21 to slide along the hinge pin 25. Moreover, a compression spring 26 is fitted over the hinge pin 25 in the right recess 24 such that the movable element 21 is normally urged to an outermost position, in which the cylindrical protrusions 23 abut the right inner walls of the recesses 24 as shown in FIG. 3. A pair of horizontal bearer surfaces 27 is formed on the top end of the right work engaging element 19 adjacent to the recesses. Additionally, a pair of matching abutment surfaces 28 is formed on the lower end of the movable element 21 where they abut on the bearer surfaces 27 when the movable element 21 is in the outermost position. The abutment surfaces 28 form a right angle with the second support surface 22.

Figure 6:
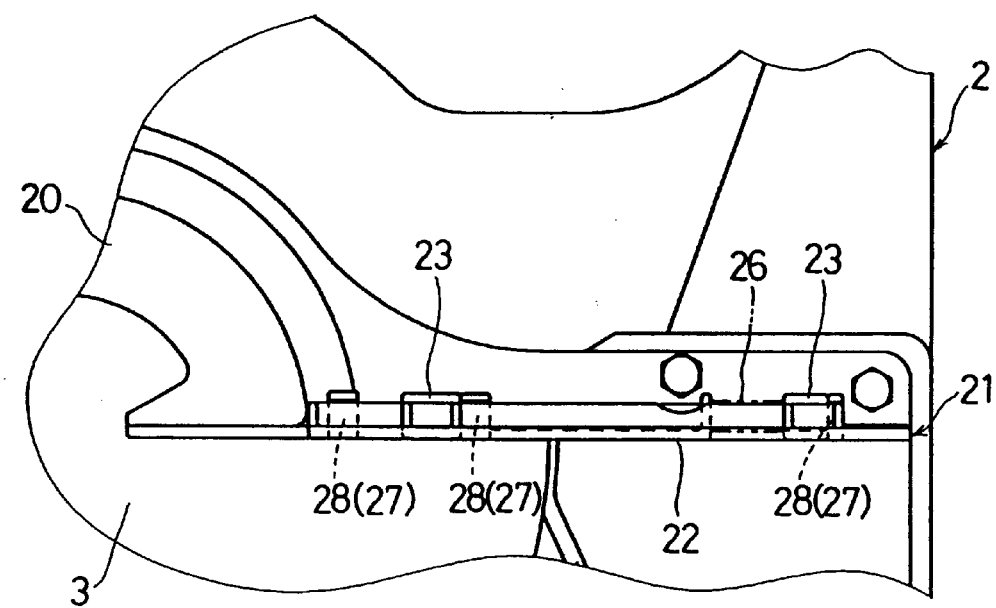
FIG. 6 is another partial plan view of the miter circular saw shown in FIG. 1, showing the movable element in a raised position.

To make vertical cuts in a workpiece, the movable element 21 is manually slid against the biasing force of the compression spring 26 toward the saw blade 5 and raised. When released, the movable element 21 slides to the aforementioned outermost position due to the biasing force of the compression spring 26, so that the abutment surfaces 28 rest on the respective bearer surfaces 27 as shown in FIGS. 3, 4A, and 6. This surface-to-surface abutment prevents the movable element 21 from pivoting backward and maintains the second support surface 22 flush or coplanar with the first support surface 19a, thus providing a large support area for cutting.

To make beveled cuts in a workpiece with the saw blade assembly 6 tilted toward the right work engaging element 19 when the movable element 21 is in the raised and outermost position, the movable element 21 is again manually slid toward the saw blade 5 to disengage the abutment surfaces 28 from the bearer surfaces 27 of the work engaging element 19. This permits the movable element 21 to be manually pivoted backward or laid down as shown in FIGS. 4B and 6. The distance between the axis O of the hinge pin 25 (see FIG. 4A) and the plane defined by the second support surface 22 is no greater than that between the same axis and the plane defined by the abutment surface 28 (L1<L2). In this way, when laid down, the movable element 21 does not protrude above the upper end of the first support surface 19a (see FIG. 4B).

According to the first embodiment, for bevel cutting, the movable element 21 can be moved out of the locus of the saw blade assembly 6 to avoid interference with the assembly when it is tilted. Although the movable element 21 is unavailable for supporting the workpiece, the remaining, fixed support surface 19a provides minimally required support for the workpiece. This makes the embodiment suitable for use in the type of miter circular saw whose saw blade assembly can be tilted in two opposite lateral directions. When making vertical cuts in workpieces, the raised movable element 21 provides a sufficient surface area against which the workpieces can be held for support.

Moreover, the movable element 21 can be easily raised and laid down by following a simple procedure. Once the movable element 21 is manually raised and released, the abutment surfaces 28 engage the respective bearer surfaces 27, thus automatically locking the movable element 21 in the raised position. Since the movable element 21 must be slid against the biasing force of the compression spring 26 before being raised or laid down, this procedure reduces the possibility of the operator mishandling the movable element 21.

It should be noted that the movable element 21 may be urged by the compression spring 26 in the opposite direction, i.e., towards the saw blade 5. The numbers and/or the shapes of the cylindrical protrusions 23, the recesses 24, the bearer surfaces 27, and the abutment surfaces 28 may be changed to su it any particular application. In this embodiment, the movable element 21 is prevented from falling backward from the raised position by maintaining the engagement between the bearer surfaces 27 and the abutment surfaces 28 by a biasing force. However, as long as the desired effect is achieved, changes and modifications are also possible. For example, a pivotal bar may be attached to the rear surface of the work engaging element 19 so that it engages the rear surface of the movable element 21 when the movable element 21 is raised. Alternatively, the cylindrical protrusions 23 and the recesses 24 may be formed with elements that engage each other when the movable element 21 is in the raised position.

Embodiment 2

Figure 7:
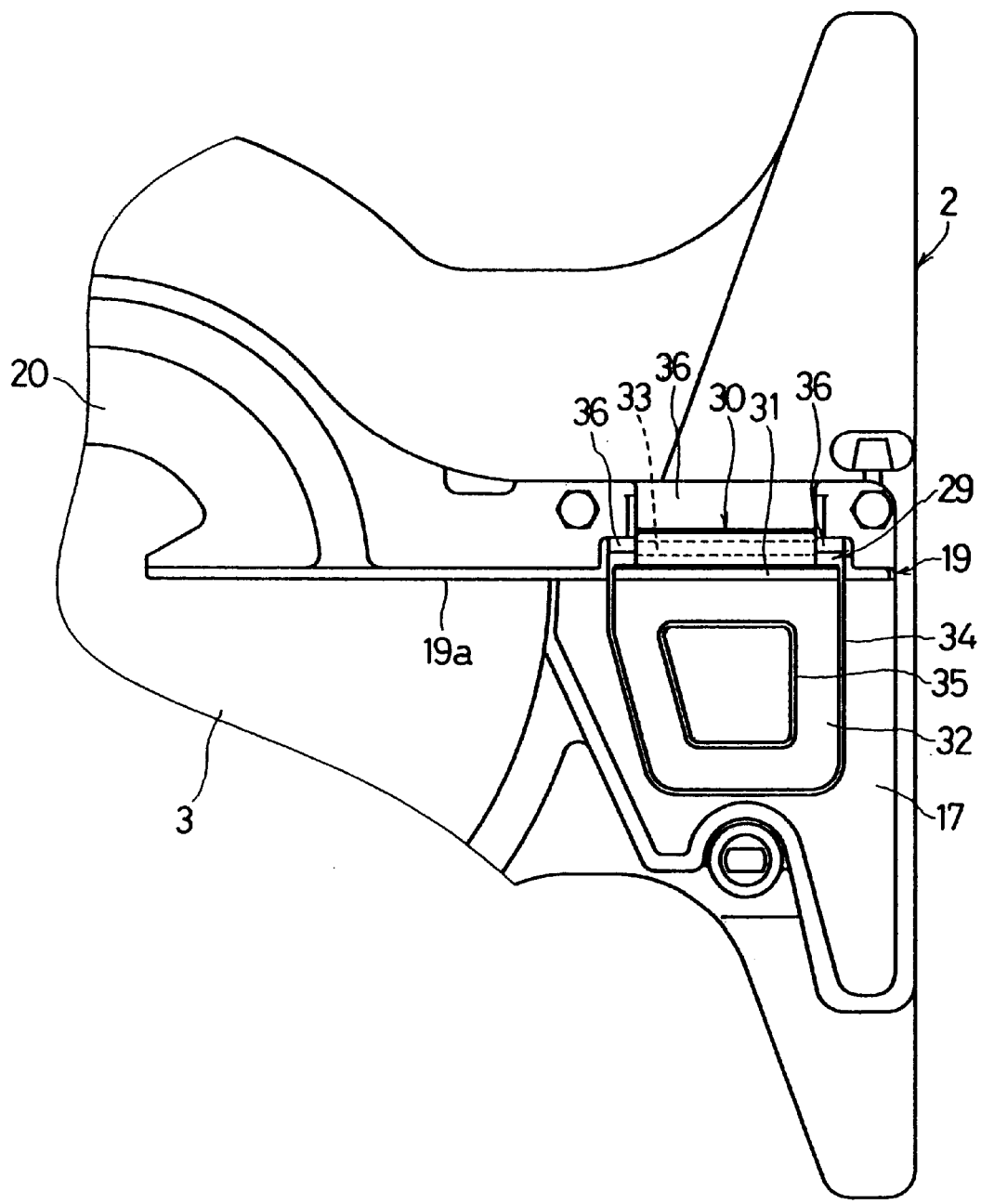
FIG. 7 is a partial plan view of a second embodiment of the present invention, showing a first support plate in a lowered position.

A second embodiment of the invention will be explained with specific reference to FIGS. 7 to 9. Except for the work support fence, the elements of this second embodiment, as well as those of the third and fourth embodiments are similar or identical to those of the first embodiment. Accordingly, similar reference numbers designate similar or corresponding parts throughout the views, and description of similar or identical elements is omitted hereinafter.

As in the first embodiment, a right work engaging element 19 with a first support surface 19a is formed having a height such that interference with the motor housing 9a when the saw blade assembly 6 is maximally tilted toward the element 19 is avoided.

The work engaging element 19 has an intermediate portion thereof cut out therefrom so as to have a window 29. A movable element 30 is hinged in the window 29. The movable element 30 includes a first rectangular support plate 31 having a width that fits snugly in the window 29 and th e same height as the work engaging element 19. The movable element 30 further includes a second, generally trapezoidal support plate 32 having at its lower end the same width as the first support plate 31 and being two and a half times the height of the work engaging element 19. The first and second support plates i and 32 are connected at their lower ends at a right angle. The movable element 30 is pivotally connected to the bottom portion of the work engaging element 19 with a hinge pin 33.

An accommodating recess 34 is formed in the top surface of the right side portion 17 of the base 2 in which to accommodate the second support plate 32. The accommodating recess 34 is so shaped that, when the second support plate 32 is pulled down, it fits in the recess 34 with the rear surface of the plate 32 flush with the top surface of the right side portion 17. A trapezoidal through-hole 35 is formed in the center of the second support plate 32 to surround a matching, non-recessed center. The purpose of the non-recessed center is to maximize the area of the top surface of the right side portion 17 with which workpieces maintain contact when the second support plate 32 is not in the accommodating recess 34. In addition, two dust removal holes 34a are formed in the bottom wall of the recess 34 to prevent wood chips and other dust from depositing in the recess so that the second support plate 32 remains flush with the top surface when accommodated in the recess. Furthermore, a pair of horizontal bearer surfaces 36 is formed on the right work engaging element 19 behind the first support surface 19a such that the rear surface of the first support plate 31 abuts on the bearer surfaces when the second support plate 32 is in the raised position.

Figure 9:
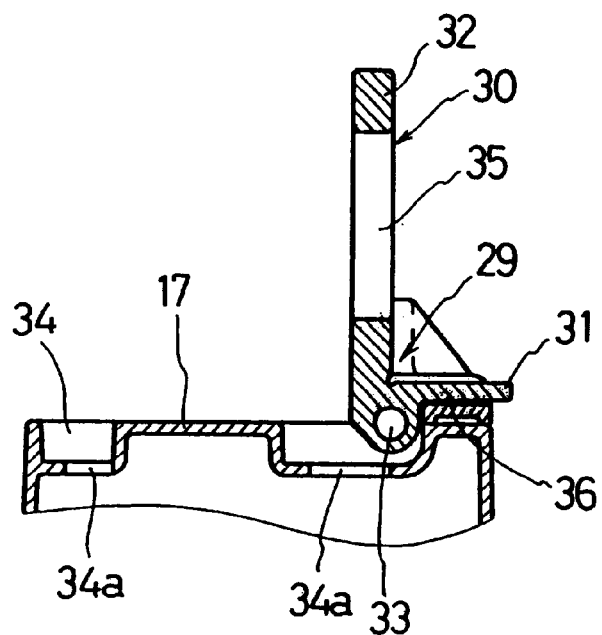
FIG. 9 is another enlarged vertical cross section of the movable element shown in FIG. 7, with the first support plate in a raised position.

To make vertical cuts in workpieces, the second support plate 32 is raised upright, as shown in FIG. 9. The first support plate 31 is simultaneously laid rearward and supported on the bearer surfaces 36. This locates the front surface of the second support plate 32 flush with the first support surface 19a of the work engaging element 19 to provide a large support surface.

Figure 8:
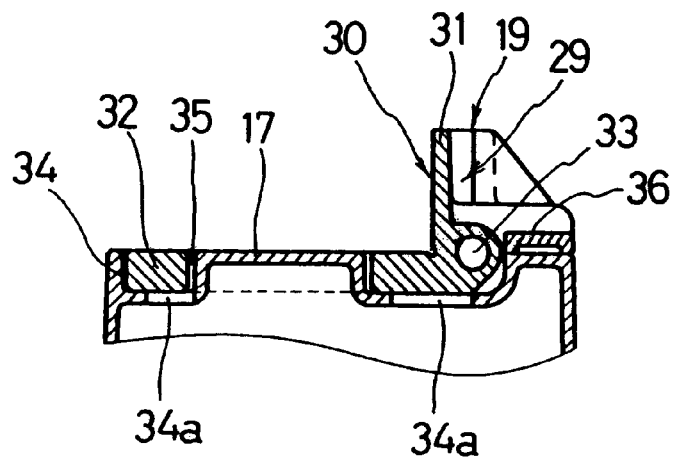
FIG. 8 is a vertical cross section of the movable element shown in FIG. 7 taken along a cylindrical protrusion, with a lower support plate in a lowered position.

To make bevel cuts in workpieces upon tilting of the saw blade assembly 6 toward the work engaging element 19, the second support plate 32 is pulled down toward the forward and fitted in the recess 34 as shown in FIG. 8. This raises the first support plate 31, locating its front surface flush with the first support surface 19a.

According to the second embodiment, the second support plate 32 can be moved out of the locus of the saw blade assembly 6 to avoid interference with the assembly when it is tilted during bevel cutting, so that the first support plate 31 provides a minimally required support for workpieces. During vertical cutting, the raised second support plate 32 provides a sufficient surface area for support. As described above, the operator can easily select a suitable support plate for a desired type of cutting by following the simple procedure of raising or lowering the movable element 30. Since the first and second support plates 31 and 32 are orthogonally connected to each other, whichever plate 31 or 32 is selected to support a workpiece, the other plate serves to maintain the selected plate in the raised position. More particularly, when the first support plate 31 is in the raised position, the second support plate 32 keeps the first support plate 31 upright. Conversely, when the second support plate 32 is in the raised position, th e first support plate 31 keeps the second support plate 32 upright. This eliminates the need for providing a separate means for securing the movable element 30, thus contributing to simplification of the entire apparatus.

The dimensions of the support plates 31 and 32 can be changed and modified to suit particular applications. In the above-described embodiment, the movable element 30 is installed with the second support plate 32 located forward of the first support plate 31. It is possible to locate the first support plate 31 forward of the second support plate 32. In this case, to use the se co nd sup port plate 32 to support workpieces, the first support plate 31 is pulled down forward into a recess shaped to accommodate it. It is preferable, in this arrangement, to provide a stopper or other suitable means to prevent the second support plate 32 from falling rearward.

Embodiment 3

Figure 10:
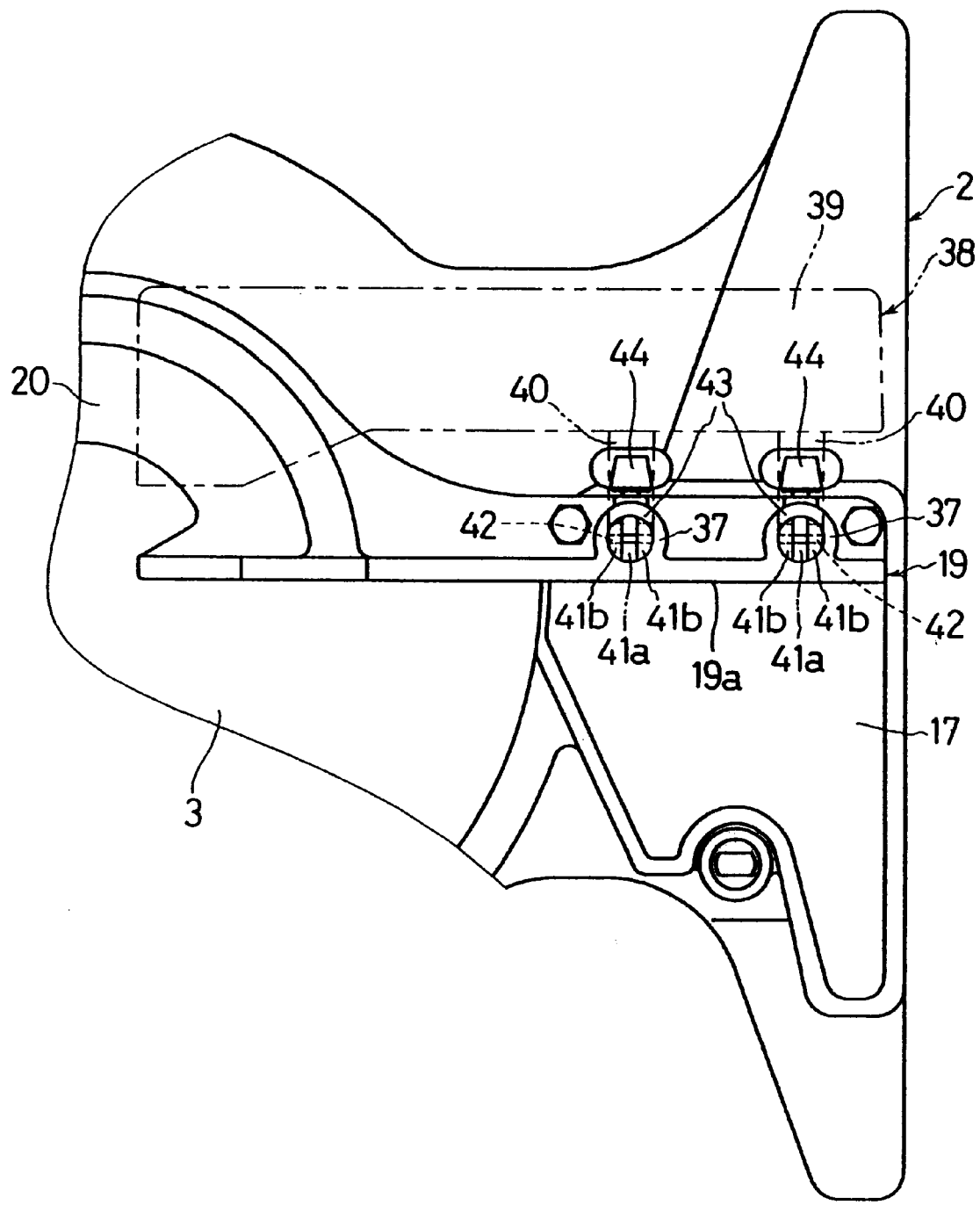
FIG. 10 is a partial plan view of a third embodiment of the present invention, showing the movable element in a raised position in solid lines and in a lowered position in two-dot chain lines.
Figure 11A:
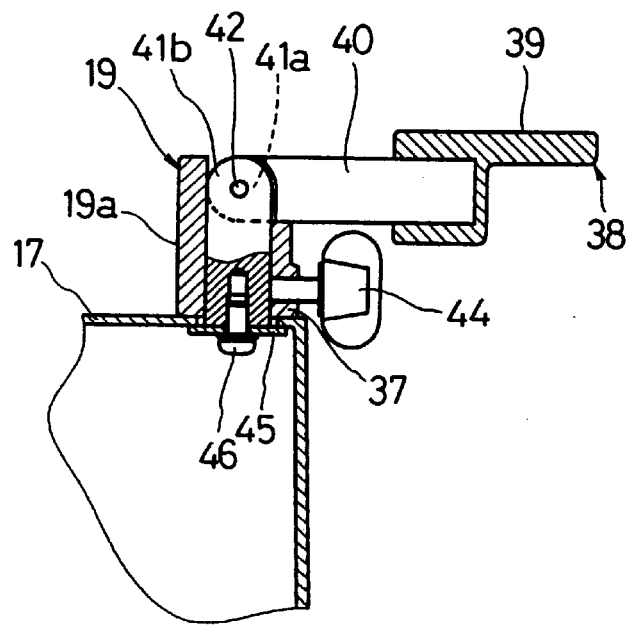
FIG. 11A is a partial cross section of the movable element of FIG. 10, showing the movable element in a lowered position.
Figure 11B:
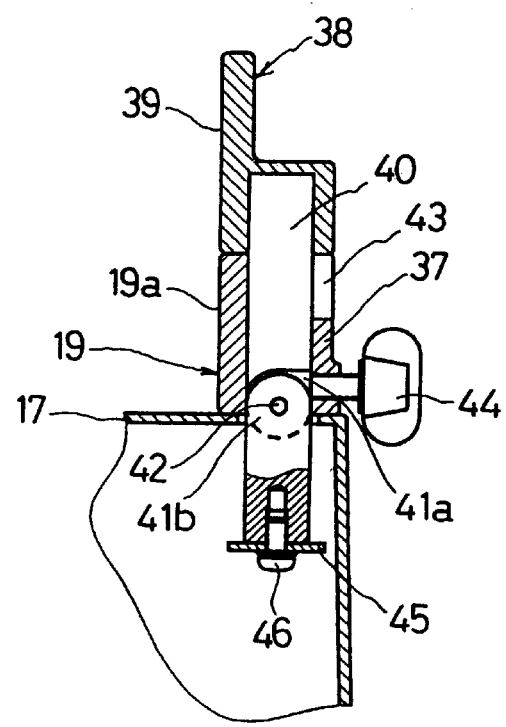
FIG. 11B is another partial cross section of the movable element of FIG. 3, showing the movable element in a raised position.

With reference to FIGS. 10, 11A and 11B, a third embodiment is described hereinafter.

As in the previous two embodiments, a right work engaging element 19 is formed having a height such that interference with the motor housing 9a when the saw blade assembly is maximally tilted toward the element 19 is avoided. A separate movable element 38 having a second support surface 39 is mounted on the upper end of the work engaging element 19. Top ends of two foldable rods 40 are secured in the movable element 38 behind the front surface thereof, whereas the lower parts of the rods are slidably inserted into a pair of cylindrical portions 37 formed behind the first support surface 19a. Each of the foldable rods 40 is composed of separate upper and lower sections. A pair of connector lugs 41b is formed on the top end of the lower section. A connector projection 41a formed on the bottom end of the upper section is interposed between the connector lugs. The two sections are foldably connected with a pin 42 penetrating the lugs 41b and the projection 41a. This allows each foldable rod 40 to pivot back and forth on the pin 42. A vertical cut-out 43 is formed in the rear surface of each cylindrical portion 37. The cut-out 43 has approximately the same width and height as the diameter of the foldable rod 40. A thumb-screw 44 is provided below each cut-out 43 and is in threaded engagement with each cylindrical portion 37 to the side wall of the foldable rod 40. The pin 42 through each foldable rod 40 is located below the cut-out 43 and in the cylindrical portion 37 when the movable element 38 is stacked on the work engaging element 19 as shown in FIG. 11B. The lower end of each foldable rod 40 penetrates the right side portion 17 of the base 2. In addition, a washer 45 is mounted on the bottom surface of each rod 40 with a screw 46 in order to prevent the rod from slipping upward out of the cylindrical portion 37.

According to the third embodiment, to make vertical cuts in workpieces, the foldable rods 40 are straightened and held vertical to place the movable element 38 on the work engaging element 19 as shown in FIG. 11B. The joint of each foldable rod 40, including the pin 42, the lugs 41b, and the projection 41 a, is then inserted into the cylindrical portion 37, thus preventing the rod from being folded. As a next step, each thumb-screw 44 is tightened until the top end thereof presses and locks the side surface of the rod 40 above the pin 42, prohibiting vertical movement of the rod. Therefore, the movable element 38 is secured on the right work engaging element 19, allowing the first support surface 19a and the second support surface 39 to be used as support for workpieces.

To make bevel cuts in workpieces, when the thumb-screws 44 are loosened and the movable element 38 is pulled up, the pins 42 of the foldable rods 40 are also pulled up to the cut-outs 43 in the cylindrical portions 37. Thereupon, as shown in FIGS. 10 (indicated by two-dot chain lines) and 11A, the foldable rods 40 are folded back 90 degrees to accommodate their upper sections in the cut-outs 43 and to lay movable element 38 horizontally. Simultaneously, the washers 45 abut on the under surface of the side portion 17, thus preventing the foldable rods 40 from slipping out and protruding above the upper end of the work engaging element 19. When the thumb-screws 44 are tightened, the two foldable rods 40 are locked in this position. Even if the movable element 38 is accidentally raised, the upper sections of the foldable rods 40 do not slip into the cylindrical portion 37.

According to the third embodiment, the movable element 38 can be moved out of the locus of the saw blade assembly 6 to avoid interference with the assembly when it is tilted during bevel cutting. Although the movable element 38 is unavailable for workpiece support, the right work engaging element 19 provides a minimally required support for workpieces. During vertical cutting, the raised movable element 38 provides a sufficient surface area for support. As described above, the operator can easily use the suitable support plate for a desired type of cutting by following a simple procedure of raising the movable element 38. In this embodiment, the movable element 38 is raised upright and laid horizontal with the separately provided foldable rods 40 located behind the movable element 38. In this manner, none of the second support surface 39 is cut or otherwise rendered useless for supporting workpieces as in the previous embodiments.

Thus, when the second support surface 39 is located flush with the first support surface 19a, these two surfaces present a continuous support surface for workpieces.

The number of foldable rods 40 need not be two as in this example; one or three rods will be equally effective depending on the application. If only one foldable rod is used, however, it is preferable to provide a suitable anti-rotation arrangement, such as a key-groove rotation stopper or bevels, between the foldable rod 40 and the cylindrical portion 37 in order to maintain the first and second support surfaces 19a and 39 flush with each other during operation. In addition, the foldable rods may be locked in position by means other than their insertion into cylindrical portions and thumb-screws as in this embodiment. For example, a pin may be inserted into the upper section of each rod in the longitudinal direction of the fence to achieve the same effect.

Embodiment 4

Figure 12:
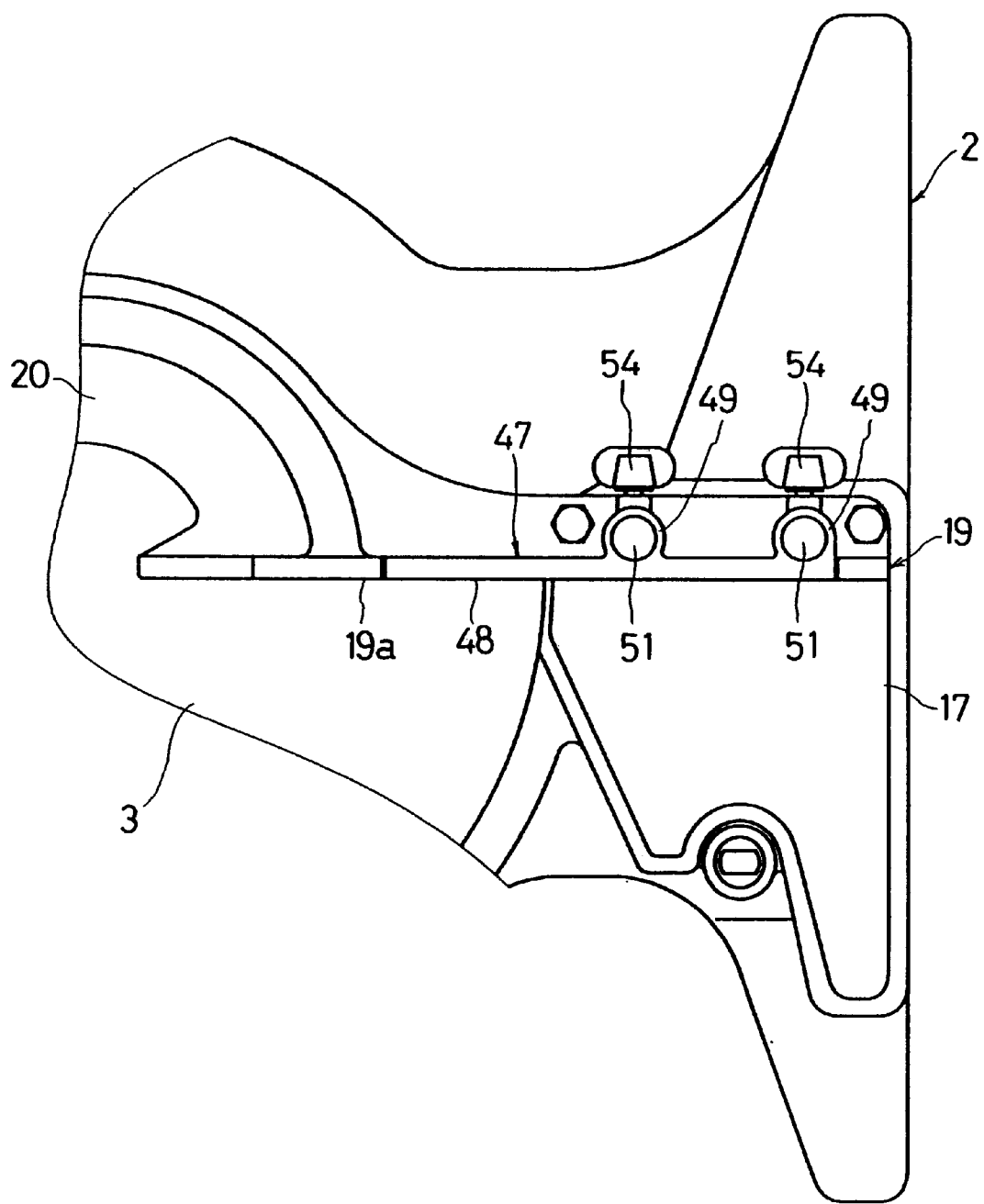
FIG. 12 is a partial plan view of a fourth embodiment of the present invention showing a movable element.
Figure 13A:
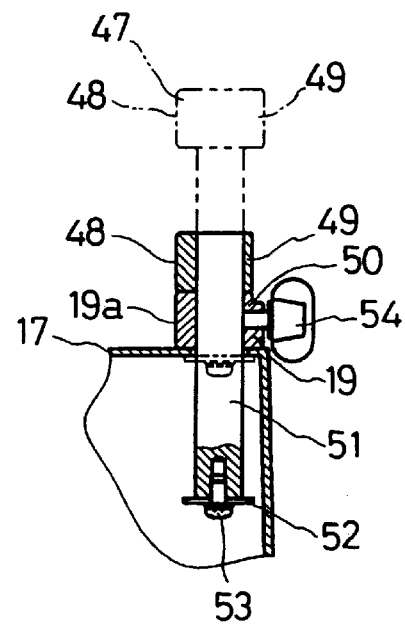
FIG. 13A is a partial cross section of the movable element of FIG. 12 in a lowered position in solid lines and in a raised position in two-dot chain lines.
Figure 13B:
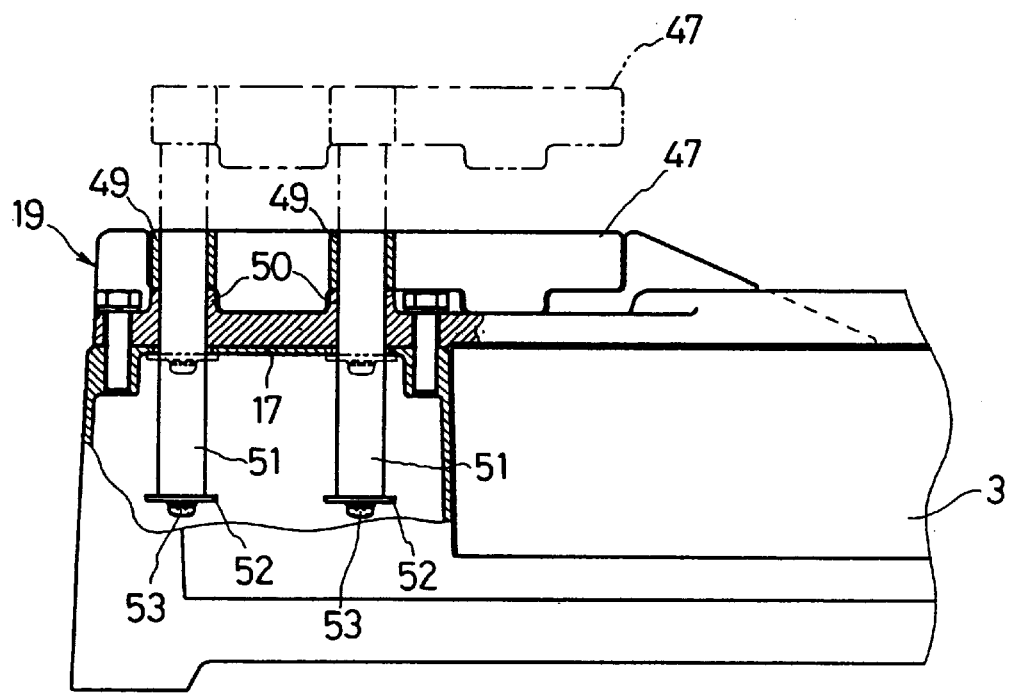
FIG. 13B is a rear view in partial cross section of the movable element of FIG. 12 in a lowered position in solid lines and in a raised position in two-dot chain lines.

With reference to FIGS. 12, 13A, and 13B, an upper portion of the right work engaging element 19 is horizontally separated into a movable element 47. When the movable element 47 is fitted in the work engaging element 19 as shown in solid lines in FIGS. 13A and 13B, its height is such as to avoid interference with the motor housing 9a when the saw blade assembly 6 is maximally tilted toward the elements. The movable element 47 has a second support surface 48 located flush with the first support surface 19a. A pair of first cylindrical portions 49 are provided on the rear surface of the movable element 47; and likewise, a pair of second cylindrical portions 50 which are vertically aligned with the first cylindrical portions 49 are provided on the rear surface of the work engaging element 19. The first and second cylindrical portions 49 and 50 come into contact with each other when the movable element 47 is in its lowermost position. A rod 51 is secured in each of the first cylindrical portions 49 with the top surface of the rod 51 flush with those of the cylindrical portions 49 and the movable element 47. The rods 51 slidably penetrate the respective second cylindrical portions 50 and the right side portion 17. A washer 52 having a larger diameter than that of the rod 51 is fixed on the bottom surface of each rod with a screw 53. A thumb-screw 54 is threadedly installed in the rear wall of each cylindrical portion 50 to the side wall of the rod 51.

To make vertical cuts in workpieces, the thumb-screws 54 are loosened to allow vertical movement of the rods 51, whereupon the movable element 47 is pulled up to a desired height. The thumb-screws 54 are then tightened to lock the rods 51 and the movable element 47 in the position, providing support for workpieces with the first and second support surfaces 19a and 48, which are vertically separated but located on the same plane. To make bevel cuts in workpieces, the movable element 47 is lowered with the thumb-screws 54 loosened until it fits into the work engaging element 19. When the movable element 47 fits in the work engaging element 19 in the lowermost position and the thumb-screws 54 are tightened again, the movable element 47 does not interfere with the saw blade assembly 6 when it is tilted to the right.

According to the fourth embodiment, during bevel cutting, the movable element 47 can be moved out of the locus of the tilting saw blade assembly 6 by retracting it in the work engaging element 19 so as to avoid interference with the assembly. For vertical cutting, the movable element 47 is pulled up in order to provide a sufficient surface area for support. As described above, the operator can easily adjust the vertical position of the movable element 47 to suit the desired type of cutting by following a simple procedure. Since part of the low work engaging element 19 is used as the movable element 47, the number of components is reduced. Furthermore, the vertical position of the movable element 47 is adjustable within a range to suit the height of the surface of the workpiece to be held against the support fence.

The number of rods 51 need not be two; for example, one or three rods will be sufficient depending on the application. If only one foldable rod is used, however, it is preferable to provide a suitable anti-rotation arrangement, such as a key-groove rotation stopper or bevels, between the foldable rod 51 and the cylindrical portion in order to maintain the two support surfaces 19a and 48 flush with each other during operation. Although one movable element 47 is provided in this embodiment, the apparatus may include two or more movable elements which are individually movable with respect to the work engaging element 19. In addition, the rods 51 may be locked in position by means other than their insertion into cylindrical portions and thumb-screws as in this embodiment. For example, a pin may be inserted through the side wall of each cylindrical portion 50 into multiple holes formed in the side surface of the rod at regular intervals.

In the first embodiment, the movable element 21 is fixed in the raised position by the abutment between the bearer surfaces 27 and the abutment surfaces 28. It is possible, with this arrangement alone, that the dimensional tolerances of the relevant components will cause rattle of the raised movable element 21. The following is an example of a means to prevent such rattle. Since the same reference numerals indicate the same elements, description thereof is omitted.

Figure 14:
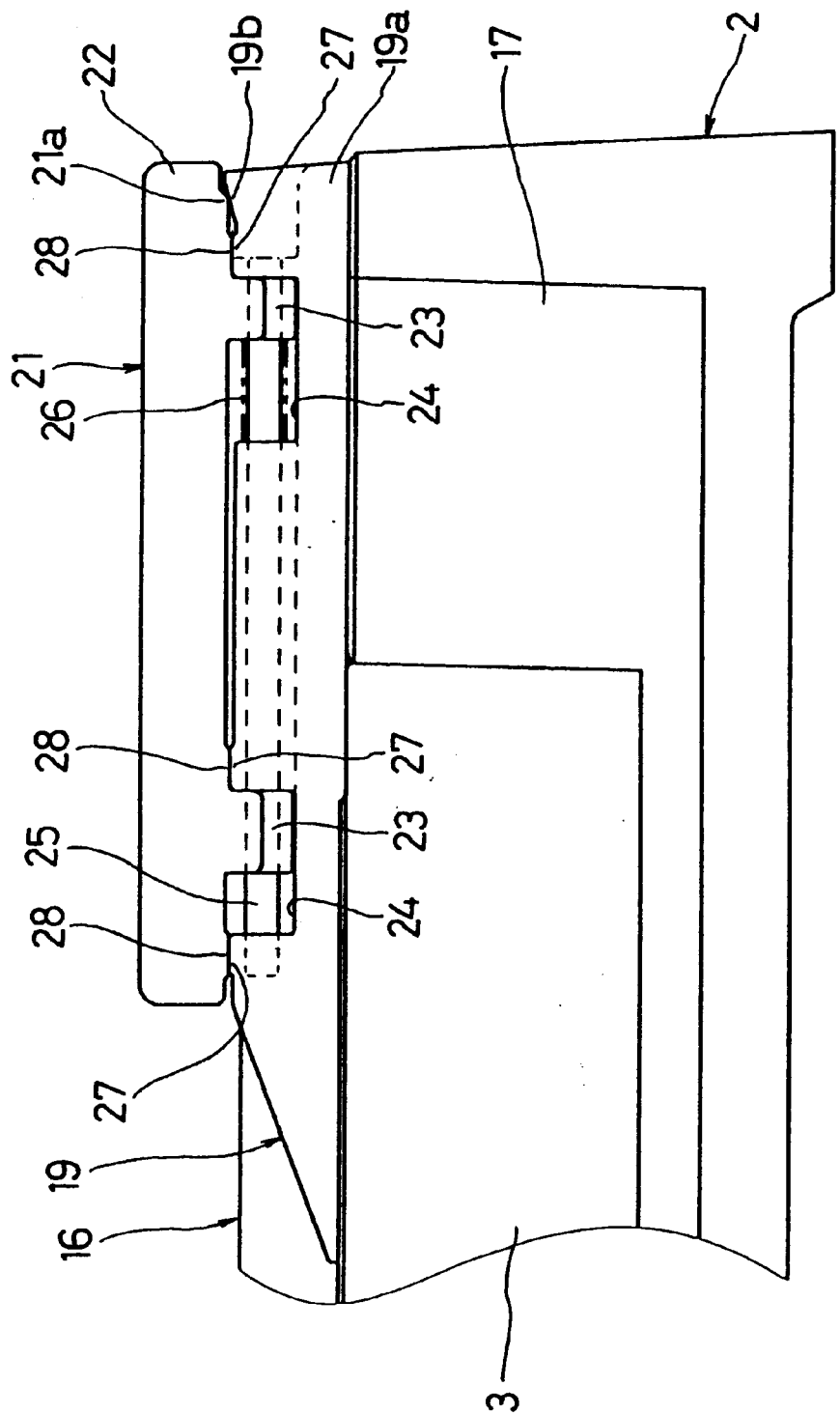
FIG. 14 is a front elevation of a modification of the movable element and the work engagement element of the work support fence of the first embodiment, with an arrangement to securing support of the movable element on the work engagement element.

With reference to FIG. 14, a push-up surface 19b that is upwardly inclined towards the right is formed on the upper outmost surface of the right work engaging element 19. A step 21a that can come into slidable contact with the push-up surface 19b is formed on the lower outermost surface of the movable element 21. The push-up surface 19b and the step 21a constitute inclined guide means for fixing the movable element 21 on the work engaging element 19. The step 21a is configured so as to abut the push-up surface 19b when the movable element 21 is slid to the outermost position by the biasing force of the compression spring 26. Accordingly, as the raised movable element 21 is slid outward, the step 21a comes into slidable contact with, and is pushed up by, the push-up surface 19b. As a result, the movable element 21 is securely supported on the work engagement element 19 without rattle even if one or more bearer surfaces 27 are not stably supported on their respective abutment surfaces 28 or if there is an error in the setting of the outermost position to which the movable element 21 is slid. This is because the slidable contact between the step 21a and the push-up surface 19b absorbs or compensates for such an error or unstable support of the bearer surfaces 27.

Figure 15:
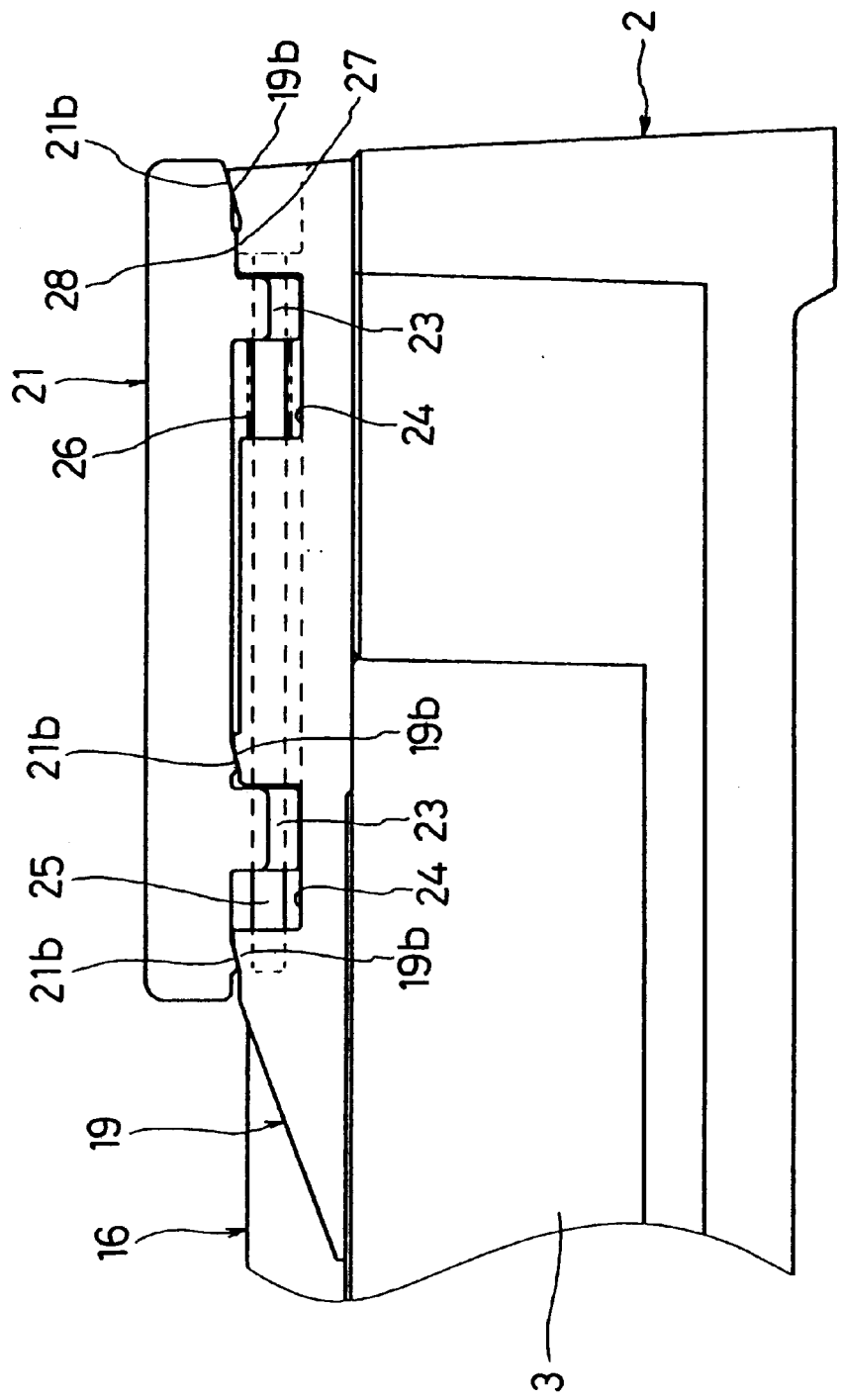
FIG. 15 is a front elevation of another modification of the movable element and the work engagement element of the work support fence of the first embodiment, with an arrangement to securing support of the movable element on the work engagement element.

Another inclined surface may be substituted for the step 21a as shown in FIG. 15. In this example, the step 21a is replaced with an inclined surface 21b that has the same inclination as the push-up surface 19b so as to achieve an effect similar to that of the arrangement shown in FIG. 14. In addition, two additional sets, each comprising an inclined surface 21b and a push-up surface 19b, are substituted for two other sets, each set consisting of a bearer surface 27 and an abutment surface 28. This modification is preferred because errors in slidable contact between the inclined surfaces are compensated for in the middle and at both ends of the movable element 21. However, a similar effect can be obtained if only one set of mutually abutting surfaces is adopted in combination with two sets, each set consisting of a bearer surface 27 and an abutment surface 28.

Figure 16:
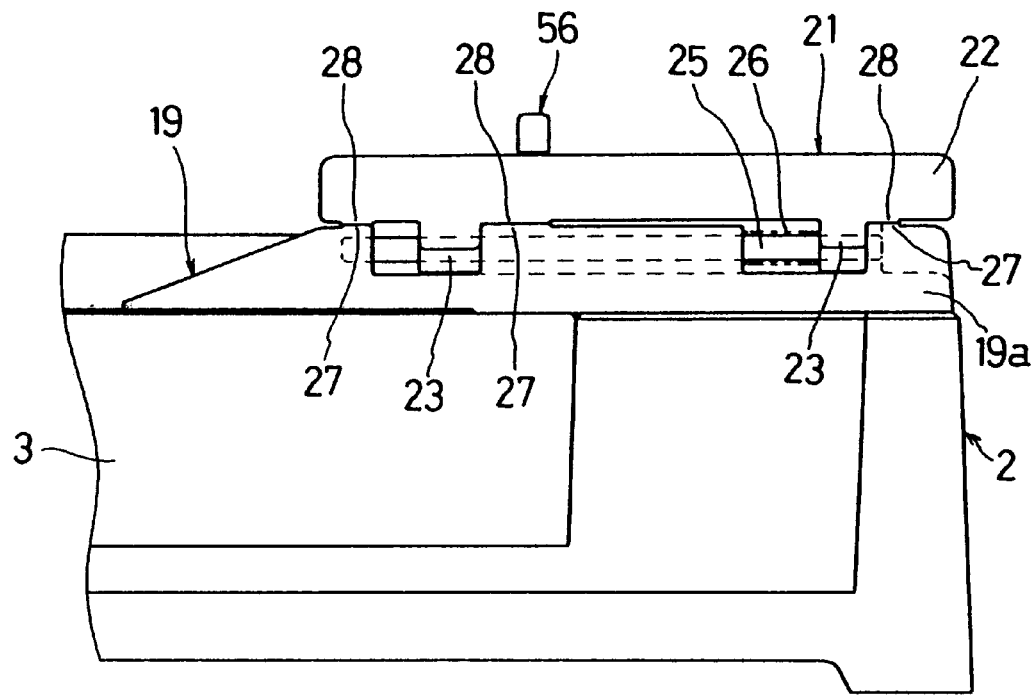
FIG. 16 is a front elevation of still another modification of the movable element and the work engagement element of the work support fence of the first embodiment, with an arrangement to securing support of the movable element on the work engagement element.
Figure 17A:
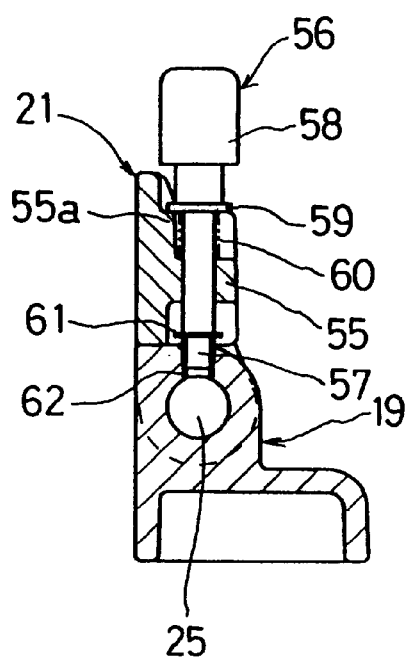
FIG. 17A is a partial cross section of the movable element and the work engagement element of FIG. 16, showing the movable element in a raised position.
Figure 17B:
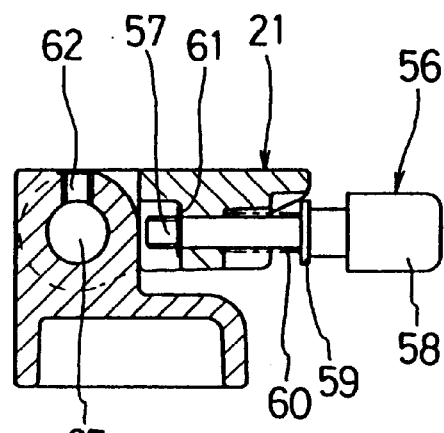
FIG. 17B is another partial cross section of the movable element and the work engagement element shown in FIG. 16, showing the movable element in a lowered position.
Figure 18:
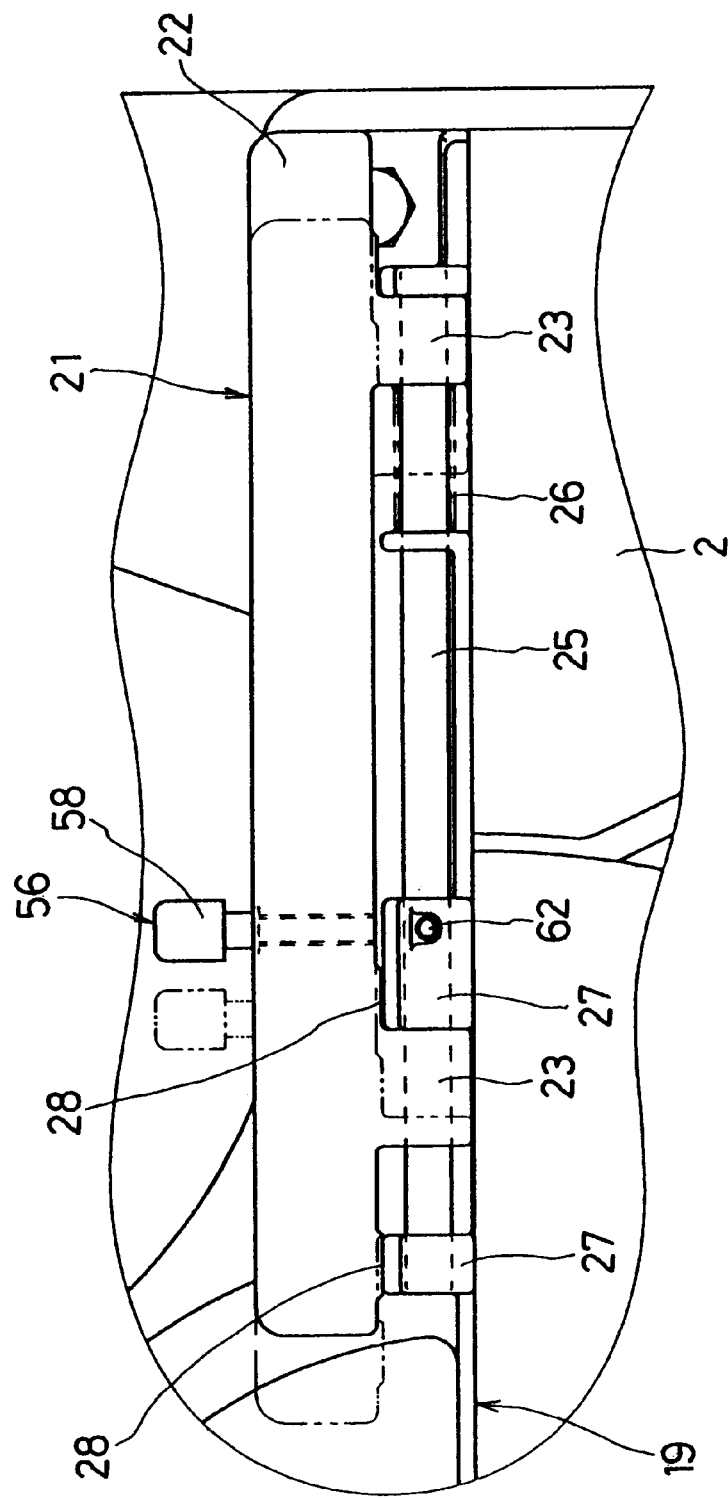
FIG. 18 is a plan view of the movable element and the work engagement element shown in FIG. 16, showing the movable element in a lowered position.

FIGS. 16, 17A, and 17B illustrate another example of an arrangement for preventing rattle of the movable element 21. A lock screw 56 is slidably inserted into a support wall 55 formed at the rear of the movable element 21 so that the lock screw 56 is disposed vertically when the movable element 21 is in the raised position. The lock screw 56 includes a threaded portion 57 at its bottom end and a knob 58 at its top end. In addition, a compression spring 60 is fitted around the lock screw 56 between a flange 59 and the support wall 55. The lock screw 56 is normally urged by the compression spring 60 to the position shown in FIG. 17B, in which a clip 61 on the lock screw abuts the support wall 55. A tapped hole 62, into which the threaded portion 57 of the lock screw 56 can be tightened, is formed in the upper surface of the work engaging element 19. As shown in FIG. 18, the tapped hole 62 is positioned so that the lock screw 56 can be tightened into it when the movable element 21 is slid to the outermost position by the compression spring 26. Moreover, a stopper step 55a formed on the support wall 55 abuts the flange 59 when the lock screw 56 is tightened in order to prevent the lock screw 56 from passing below a predetermined level when tightened.

Figure 19:
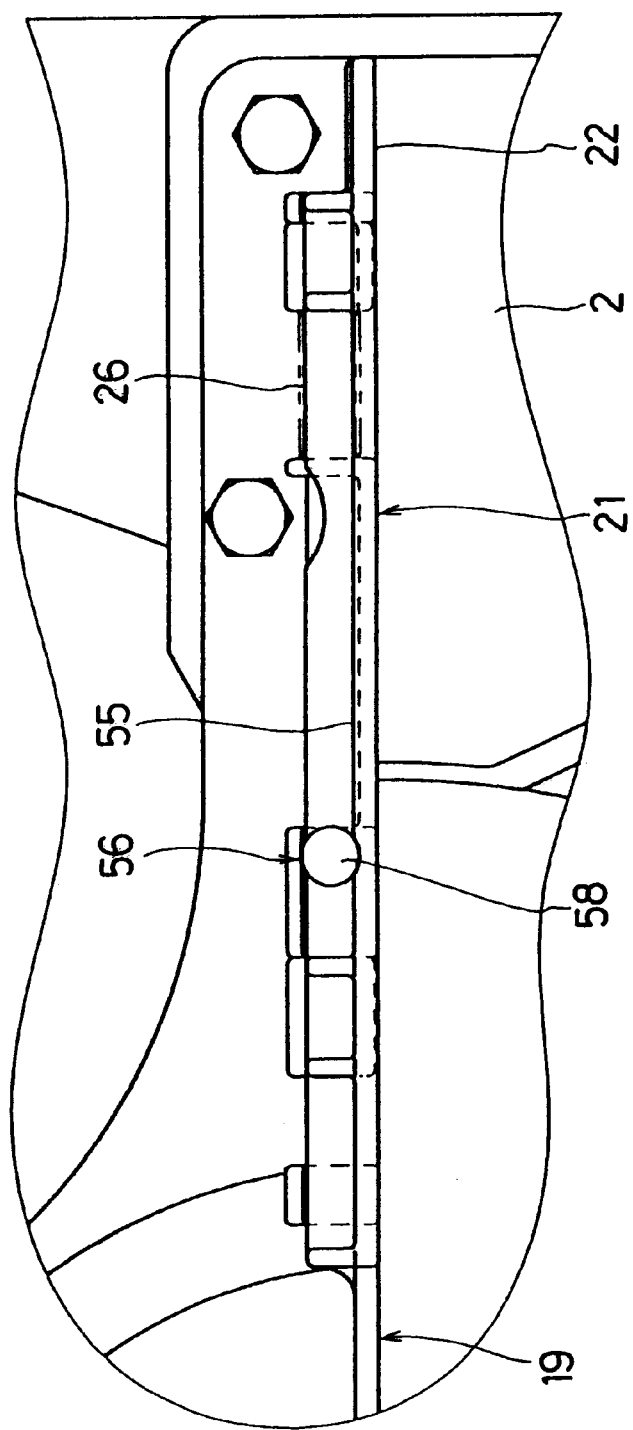
FIG. 19 is a plan view of the movable element and the work engagement element shown in FIG. 16, showing the movable element in a lowered position.

According to this arrangement, as shown in FIG. 17A, when the movable element 21 is raised in its outermost position, the lock screw 56 can be tightened into the tapped hole 62 until the flange 59 abuts the stopper step 55a. Thereupon, as shown in FIGS. 16 and 19, the movable element 21 is pressed against the work engaging element 19 by the flange 59, thus firmly supporting the movable element on the work engaging element without any rattle. To take down the movable element 19, the lock screw 56 is loosened out of the tapped hole 62. This permits an operator to manually slide the movable element 21 toward the circular saw blade 1 and to push it down to the rear of the work engaging element 19.

It will be appreciated by a person of ordinary skill in the art that a plurality of lock screws 56 may be installed. For example, two such lock screws 56 may be used at both ends of the movable element 21.

In the above-described embodiments, a movable fence element is applied only in conjunction with the right work engaging element 19. It should be noted that such a movable element can be provided in conjunction with the left work engaging element 18 or that two movable elements can be provided for both right and left work engaging elements 18, 19. In the illustrated embodiments, the right work engaging element is constructed in a lower position than the left element along its entire length so as to avoid interference with the locus of the saw blade assembly 6. If the saw blade assembly 6 interferes with only part of the right work engaging element 19, however, any of the movable elements of the four embodiments may be provided in conjunction with the part with which the assembly interferes, with the remaining part extending to a higher level.

The present invention has been described as applied to a slide-type miter circular saw which is provided with a turntable and capable of bevel cutting. It will be understood by a person with ordinary skill in the art that the present invention is likewise applicable to different types of apparatus in which a tilted saw blade assembly interferes with a fence used for supporting workpieces.

As a number of modifications and changes are possible without departing from the scope or spirit of the essential characteristics of the present invention, it is to be understood that the above embodiments are only an illustration and not restrictive in any sense. The scope or spirit of the present invention is limited only by the terms of the appended claims.

We claim:

1. A miter circular saw comprising a base on which a workpiece is placed, a saw blade assembly, including a motor-driven saw blade having a side face, mounted on the base, the saw blade assembly being tiltable to a desired angle relative to the side face of the saw blade and being translatable along a sawing path, and a work support fence mounted on the base for supporting the workpiece, the work support fence including a fixed element having a first support surface on which the workpiece is supported and extending above the base to a height selected to avoid interference with the saw blade assembly when the saw blade assembly is tilted to the desired angle and translated along the sawing path, and a movable element having a second support surface and being hinged to the fixed element to allow movement of the movable element between a first raised position above the fixed element, in which the second support surface is coplanar with the first support surface, and a first lowered position away from the workpiece.

2. A miter circular saw in accordance with claim 1, further including means for fixing the movable element in the first raised position.

3. A miter circular saw in accordance with claim 2, wherein the fixed element has an upper end and the movable element has a lower end, and further wherein the means for fixing includes at least one lower contact surface formed on the upper end of the fixed element and at least one upper contact surface formed on the lower end of the movable element, the at least one upper contact surface being brought into contact with the at least one lower contact surface when the movable element is moved to the first raised position.

4. A miter circular saw in accordance with claim 3, wherein
the movable element, while moving from the first lowered position to the first raised position, passes through a second raised position, the path traversed by the movable element between the second raised position and the first raised position being parallel to the first support surface, and wherein
the means for fixing further includes means for urging the movable element to slide from the second raised position to the first raised position, thereby bringing the at least one upper contact surface into contact with the at least one lower contact surface.

5. A miter circular saw in accordance with claim 4, wherein the at least one upper contact surface comprises an upper horizontal surface and the at least one lower contact surface comprises a lower horizontal surface having approximately the same area as the upper horizontal surface.

6. A miter circular saw in accordance with claim 4, wherein the at least one lower contact surface comprises a first inclined surface and the at least one upper contact surface comprises a second inclined surface having approximately the same inclination as the first inclined surface.

7. A miter circular saw in accordance with claim 4, wherein the at least one lower contact surface comprises an inclined surface and that at least one upper contact surface comprises a stepped portion for coming into contact with, and being urged upward by, the lower inclined surface when the movable element is slid to the first raised position.

8. A miter circular saw in accordance with claim 3, further comprising screw means provided in the movable element for engaging the fixed element when the movable element is in the first raised position.

9. A miter circular saw comprising
a base having a top surface on which a workpiece is placed,
a saw blade assembly including a motor-driven saw blade having a side face and mounted on the base, the saw blade assembly being tiltable to a desired angle relative to the side face of the saw blade and being translatable along a sawing path,
a work support fence mounted on the base and against which the workpiece is pressed for support, the work support fence extending above the top surface to a height selected to avoid interference with the saw blade assembly when the saw blade assembly is tilted to the desired angle and translated along the sawing path,
a movable element movably engaged with the work support fence and adapted to move between a raised position and a lowered position, the movable element including
a first support plate having a bottom end and extending to the selected height above the top surface when the movable element is in the lowered position, and
a second support plate which, when the movable element is in the raised position, extends above the top surface to a height greater than the selected height, the second support plate having a bottom end forming an orthogonal connection with the bottom end of the first support plate so that the first and second support plates are selectably pivoted, about the orthogonal connection between the raised position and the lowered position, and
a recess formed in the base for accommodating the second support plate so that, when the movable element is in the lowered position, the second support plate lies flat in the recess and protrudes no higher than the top surface.

10. A miter circular saw in accordance with claim 9, wherein
the work support fence includes a first support surface against which the workpiece is pressed for support,
the first support plate of the movable element includes a second support surface located coplanar with the first support surface when the movable element is in the lowered position, and
the second support plate of the movable element includes a third support surface located coplanar with the first support surface when the movable element is in the raised position.

11. A miter circular saw in accordance with claim 10, wherein
the second support plate is shaped so that when the movable element is in the lowered position, the second support plate lies in the recess flush with the top surface of the base.

12. A miter circular saw in accordance with claim 11, wherein
when the movable element is in the raised position, the second support plate extends to a height above the top surface at least twice the selected height, and
the second support plate includes a through-hole formed in a center portion thereof, and
wherein the recess includes a protrusion in the center thereof, the protrusion being shaped to correspond to the shape of the through-hole.

13. A miter circular saw comprising
a base on which a workpiece is placed,
a saw blade assembly, including a motor-driven saw blade having a side face, mounted on the base, the saw blade assembly being tiltable to a desired angle relative to the side face of the saw blade and being translatable along a sawing path, and
a work support fence mounted on the base for supporting the workpiece, the work support fence including
a fixed element having a first support surface on which the workpiece is supported and a rear surface, the fixed element extending above the base to a height selected to avoid interference with the saw blade assembly when the saw blade assembly is tilted to the desired angle and translated along the saw path,
a movable element having a second support surface,
connecting means provided upright on the rear surface of the fixed element, the connecting means being foldable in a direction away from the first support surface at a point located lower than the fixed element and having a top end which is secured to the movable element, wherein the movable element is adapted so as to be movable, as the connecting means is folded, between a raised position above the fixed element, in which the second support surface is coplanar with the first support surface and a lowered position away from the first support surface, and lock means for preventing the connecting means from folding away from the first support surface when the movable element is in the raised position.

14. A miter circular saw in accordance with claim 13, wherein the connecting means comprises at least one rod which includes an upper section pivotable away from the first support surface of the fixed element, a lower section separated from the upper section, and a pin for pivotally connecting the upper section with the lower section, wherein the miter circular saw further includes, on the rear surface of the fixed element, at least one cylindrical portion into which the at least one rod is inserted so as to be vertically slidable between an upper position corresponding to the lowered position of the movable element and a lower position in which the upper and lower sections are held straight, the lower position corresponding to the raised position of the movable element, and wherein the lock means includes at least one screw penetrating the at least one cylindrical portion to the at least one rod, such that when tightened, the at least one screw presses the at least one rod.

15. A miter circular saw in accordance with claim 14, wherein the at least one rod further includes means for preventing the at least one rod from slipping out of the at least one cylindrical portion.

16. A miter circular saw comprising a base on which a workpiece is placed, a saw blade assembly mounted on the base, the saw blade assembly including a motor-driven saw blade having a side face and being tiltable to a desired angle relative to the side face of the saw blade said being translatable along a saw path, a work support fence mounted on the base and extending above the base to a height selected to avoid interference with the saw blade assembly when the saw blade assembly is tilted to the desired angle and translated along the saw path, the work support fence having a lower portion with a front surface for supporting the workpiece, a rear surface, and an upper movable portion having a front surface and a rear surface, the upper movable portion being separable from the lower portion, at least one vertical rod slidably engaged with the lower portion of the work support fence and having a top end which is connected to the upper movable portion, and lock means for fixing the at least one vertical rod in a desired vertical position.

17. A miter circular saw in accordance with claim 16, wherein the front surface of the upper movable portion remains coplanar with the front surface of the lower portion, regardless of the vertical position of the upper movable portion.

18. A miter circular saw in accordance with claim 17, wherein the work support fence further includes on the rear side thereof at least one cylindrical portion into which the at least one vertical rod is slidably inserted, and wherein the lock means includes at least one screw penetrating the at least one cylindrical portion to press the at least one rod when tightened.

19. A miter circular saw in accordance with claim 18, wherein the at least one rod further includes means for preventing the rod from slipping out of the at least one cylindrical portion.

* * * * *